US009948888B1

(12) United States Patent
Agarwal (10) Patent No.: US 9,948,888 B1
(45) Date of Patent: Apr. 17, 2018

(54) TECHNIQUES FOR UTILIZING A TELEVISION FOR A VIDEO CHAT SESSION

(71) Applicant: Google Inc., Mountain View, CA (US)

(72) Inventor: Amit Agarwal, Newark, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/228,203

(22) Filed: Aug. 4, 2016

(51) Int. Cl.
*H04N 7/14* (2006.01)
*H04N 7/15* (2006.01)

(52) U.S. Cl.
CPC ............ *H04N 7/147* (2013.01); *H04N 7/15* (2013.01)

(58) Field of Classification Search
USPC .......................................... 348/14.01–14.09
See application file for complete search history.

(56) References Cited

U.S. PATENT DOCUMENTS

| | | | | |
|---|---|---|---|---|
| 2008/0299905 A1* | 12/2008 | Kumar | ............... | H04M 1/7253 455/41.2 |
| 2008/0316296 A1* | 12/2008 | King | ..................... | H04N 7/152 348/14.09 |
| 2011/0249073 A1* | 10/2011 | Cranfill | ................. | H04N 7/147 348/14.02 |
| 2012/0056971 A1* | 3/2012 | Kumar | ................. | H04M 3/567 348/14.02 |
| 2016/0119262 A1* | 4/2016 | Siegel | ................. | H04L 51/066 709/206 |

* cited by examiner

*Primary Examiner* — Maria El-Zoobi
(74) *Attorney, Agent, or Firm* — RMCK Law Group, PLC (57) ABSTRACT

Computer-implemented techniques can include in response to a request, establishing, between a first and second computing devices, a video chat session. The techniques can include receiving, by the first computing device and from a user, an input to operate a casting device in an output mode for the video chat session, the casting device being connected to a display and, in response to receiving the input, transmitting, to the casting device, configuration information that causes the casting device to (i) receive, from the other computing device, first audio/video information for the video chat session and (ii) output, via the display, the first audio/video information during the output mode. The techniques can also include capturing, by the first computing device, second audio/video information for the video chat session and transmitting, to the other computing device, the second audio/video information.

21 Claims, 3 Drawing Sheets

TECHNIQUES FOR UTILIZING A TELEVISION FOR A VIDEO CHAT SESSION

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users often participate in real-time audio/video communication or "video chat" sessions via their mobile devices (tablet computers, mobile phones, etc.). The small form factor of these devices is typically not a problem, such as when a video chat session is between only two users. When a large group of users are participating on at least one side of the video chat session, however, the display and/or camera capabilities of the mobile device may be inadequate. For example, many users of the group of users may be unable to see the display of the mobile device and thus may be unable to fully participate in the video chat session.

SUMMARY

According to a first aspect of the present disclosure, a computer-implemented technique is presented. The technique can include detecting, by a first computing device having one or more processors, a request to establish a video chat session between the first computing device and a second computing device; in response to the detecting, establishing, between the first and second computing devices, the video chat session; receiving, by the first computing device and from a user, an input to operate a casting device in an output mode for the video chat session, the casting device being connected to a display; in response to receiving the input, transmitting, from the first computing device and to the casting device, configuration information that causes the casting device to (i) receive, from the second computing device, first audio/video information for the video chat session and (ii) output, via the display, the first audio/video information during the output mode; capturing, by the first computing device, second audio/video information for the video chat session; and transmitting, from the first computing device and to the second computing device, the second audio/video information.

According to a second aspect of the present disclosure, a first computing device is presented. The first computing device can include one or more processors and a non-transitory memory storing a set of instructions that, when executed by the one or more processors, causes the first computing device to perform operations. The operations can include detecting a request to establish a video chat session between the first computing device and a second computing device; in response to the detecting, establishing, between the first and second computing devices, the video chat session; receiving, from a user, an input to operate a casting device in an output mode for the video chat session, the casting device being connected to a display; in response to receiving the input, transmitting, to the casting device, configuration information that causes the casting device to (i) receive, from the second computing device, first audio/video information for the video chat session and (ii) output, via the display, the first audio/video information during the output mode; capturing second audio/video information for the video chat session; and transmitting, to the second computing device, the second audio/video information.

According to a third aspect of the present disclosure, a non-transitory computer-readable medium is presented. The computer-readable medium can have a set of instructions stored thereon that, when executed by one or more processors of a first computing device, causes the first computing device to perform operations. The operations can include detecting a request to establish a video chat session between the first computing device and a second computing device; in response to the detecting, establishing, between the first and second computing devices, the video chat session; receiving, from a user, an input to operate a casting device in an output mode for the video chat session, the casting device being connected to a display; in response to receiving the input, transmitting, to the casting device, configuration information that causes the casting device to (i) receive, from the second computing device, first audio/video information for the video chat session and (ii) output, via the display, the first audio/video information during the output mode; capturing second audio/video information for the video chat session; and transmitting, to the second computing device, the second audio/video information.

In some embodiments, receipt of the configuration information causes the casting device to (i) receive the first audio/video information directly from the second computing device and (ii) output the first audio/video information directly via the display. In some embodiments, receipt of the configuration information causes the casting device to (i) continue outputting, via the display, third audio/video information corresponding to another audio/video stream and (ii) output, via the display, an indication of the first audio/video information in a smaller window than the third audio/video information.

In some embodiments, the technique/operations further comprise: receiving, at the first computing device and from the user, another input; and transmitting, from the first computing device and to the casting device, the other input, wherein receipt of the other input causes the casting device to switch between the casting device outputting, via the display, (i) the first audio/video information and (ii) third audio/video information corresponding to another video stream. In some embodiments, the first audio/video information includes at least first video information, and wherein outputting, via the display, the first audio/video information includes sizing a window for the first audio/video information based on a set of size-indicative parameters.

In some embodiments, the first audio/video information includes only first audio information, and wherein outputting, via the display, the first audio/video information includes only outputting an indicator of the first audio information. In some embodiments, the first computing device does not output the first or second audio/video information via its audio/video output devices. In some embodiments, the technique/operations further comprise: receiving, at the first computing device and from the user, another input for adjusting a visual parameter of the video chat session; and transmitting, from the first computing device and to the casting device, the other input, wherein the other input causes the casting device to adjust, via the display, a visual parameter of the first audio/video information.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As mentioned above, the small form factor of mobile computing devices may make them inadequate for video chat sessions involving a large group of users. Accordingly, improved techniques for utilizing a display for a video chat session requested at a mobile computing device are presented. The display can be any suitable device configured for the visual output of information, including, but not limited to, a television, a video or computer monitor, and a wearable computing device (a smartwatch, eyewear, etc.) Televisions, for example, typically have a large display and a wide aspect ratio, which can enhance the video chat experience for a large group of users. Conventional techniques allow users to "mirror" a display of their mobile computing device other devices, such as a television. Mirroring refers to displaying the contents of one video display device on the screen of another device at the same time. This mirroring, however, is often low quality and out-of-sync with the mobile computing device. These techniques also do not allow a user to accept or initiate a video chat session via their television. Televisions and other display devices that are specifically integrated with a particular video chatting service (e.g., via a video chat application) also exist, but these devices are typically expensive and are also limited to the particular video chatting service.

The techniques of the present disclosure can leverage the presence of a video streaming or "casting" device connected to a display. The term "casting" is short for "broadcasting" and the phrase "casting device" as used herein can refer to any suitable wireless transceiver configured to be connected to the display. This casting device can be associated with a particular user that is invited to a video chat sessions. For example, the casting device can be logged into a user account of the user along with other devices associated with the user, such as their mobile computing device. This mobile computing device (e.g., a mobile phone) can also be utilized as part of the video chat session. The casting device can receive such information either from the mobile computing device or directly from a remote server computing device (e.g., associated with the user account), which can then be output at the display. During the video chat session, the user can also input audio/video information via their mobile computing device, which can then be sent to the other participating device(s).

The technical advantages of these techniques can include being able to utilize a larger display (e.g., a television) for a video chat session, while still utilizing the user's mobile computing device to capture and transmit audio/video information (e.g., using its integrated microphone and camera) for transmission to the other participating computing device(s). The technical advantages of these techniques can also include the audio/video information from the other participating computing device(s) being routed directly to the display via the casting device. Because no mirroring of routing of this audio/video information through the mobile computing device is occurring, the audio/video output at the display is faster. By leveraging the fact that the casting device is associated (e.g., logged into the same account at a server) as the mobile computing device, the configuration for its reception of audio/video information for video chat sessions involving the mobile computing device can be easily performed by the server. This process is much simpler than manually pairing a mobile computing device with other devices (the casting device, the display, etc.).

Figure 1:
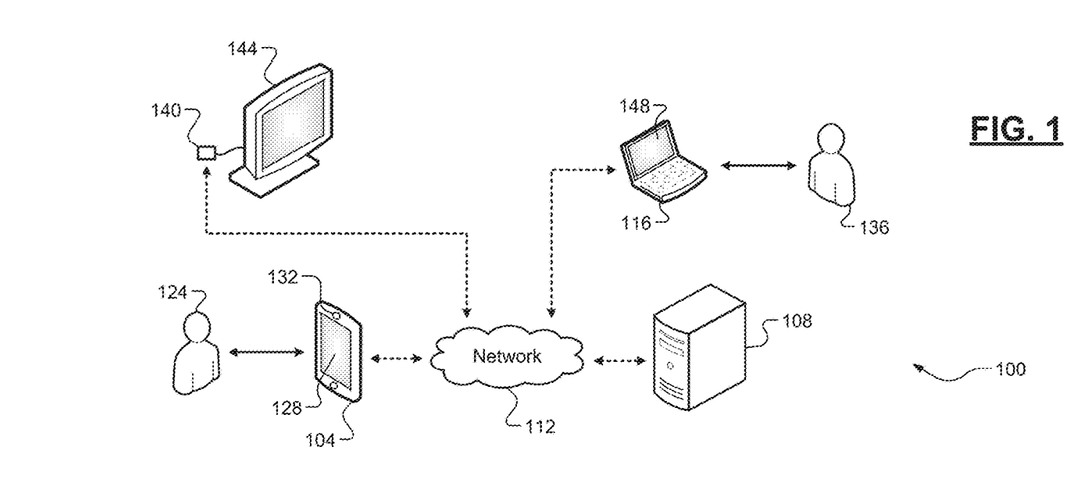
FIG. 1 is a diagram of an example computing network according to some implementations of the present disclosure.

Referring now to FIG. 1, an example computing network 100 is illustrated. The computing network 100 can include a mobile computing device 104 that can communicate with a server computing device 108 via a network 112. While a mobile configuration for device 104 is shown and discussed herein, it will be appreciated that device 104 could be any suitable computing device (a desktop computer, a laptop computer, etc.). The network 112 can be a local area network (LAN), a wide area network (WAN), e.g., the Internet, or a combination thereof. Another computing device 116 can also communicate with the server computing device 108 via the network 112. In some implementations, the server computing device 108 can coordinate a video chat session between the mobile computing device 104 and the other computing device 116. As part of the video chat session, a user 124 of the mobile computing device 104 can utilize a display 128 and a camera 132 of the mobile computing device 104. Other components of the mobile computing device 104, such as a microphone (not shown), can also be utilized as part of the video conference session. Similarly, a user 136 of the other computing device 116 could utilize it to participate in the video chat session.

The mobile computing device 104 can also be associated with a casting device 140 that is connected to a display 144, such as a non-smart television that is not configured for communication via the network 112, such as for the execution of video chatting/streaming software applications. While the non-smart television configuration for the display 144 is shown and described herein, it will be appreciated that the techniques could be similarly applied to smart televisions. One example of the casting device 140 is a high-definition multimedia interface (HDMI) dongle comprising a wireless transceiver, but it will be appreciated that the casting device 140 could be any computing device comprising a wireless transceiver that is connectable to the display 144, such as via a universal serial bus (USB). The display 144 is a television or any other suitable display device that does not itself have the capability to communicate with a particular chat service/application or the mobile computing device 104 or, in some cases, may not have any capability to communicate via the network 112. The association between the mobile computing device 104 and the casting device 140 can be that both devices are logged into a same account, e.g., at the server computing device 108. In other words, both devices 104, 140 may be associated with a user account for the user 124.

Figure 2:
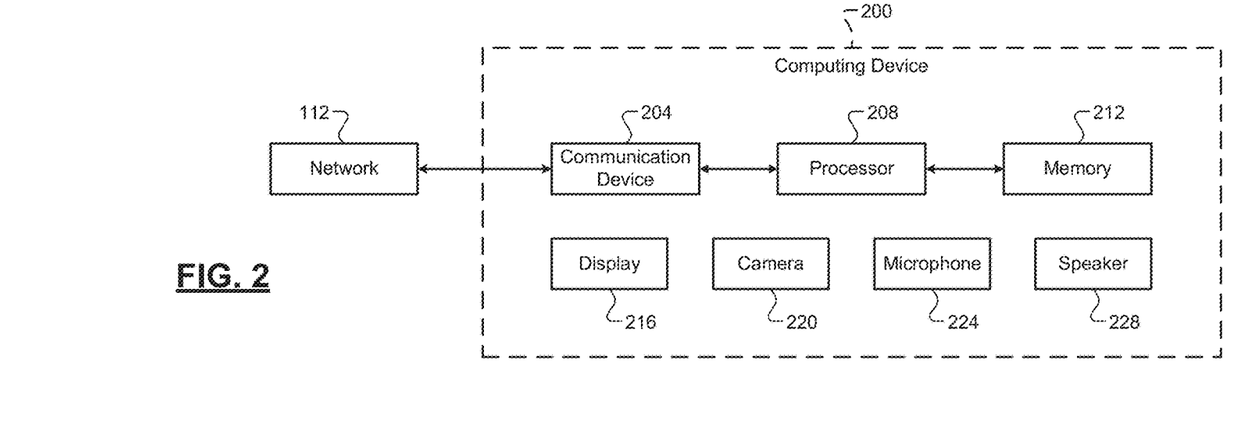
FIG. 2 is a functional block diagram of an example computing device of FIG. 1.

Referring now to FIG. 2 and with continued reference to FIG. 1, an example computing device 200 is illustrated. The computing device 200 can represent a configuration of the mobile computing device 104. It will be appreciated, however, that the same or similar configuration of the computing device 200 could represent configurations of the server computing device 108, the other computing device 116, and the casting device 140. The computing device 200 can include a communication device 204 (e.g., a wireless transceiver) configured for communication via the network 112. It will be appreciated that the communication device 204 could also be configured for short-range wireless communication (Bluetooth, WiFi Direct, etc.), such as between the mobile computing device 104 and the casting device 140 (e.g., during initial setup/configuration). The computing device 200 can also include a processor 208 configured to control operation of the computing device 200. The term "processor" as used herein can refer to both a single processor and two or more processors operating in a parallel or distributed architecture.

The computing device 200 can include a non-transitory memory 212 (hard disk, flash, etc.) configured to store information at the computing device 200, such as a set of instructions that, when executed by the processor 208, cause the computing device 200 to perform at least a portion of the techniques of the present disclosure. The computing device 200 can also include other components, such as a display 216, a camera 220, a microphone 224, and a speaker 228. The display 216 can output information (e.g., received video information) and, in some implementations (e.g., a touch display), the display 216 can receive user input. The camera 220 can capture video information and the microphone 224 can capture audio information. This audio/video information can be used as part of a video chat session. The speaker 228 can output sound, such as in response to received audio information. The processor 204 can control the input/output via these various components.

As previously mentioned, the casting device 140 can be associated with the user 124 and the mobile computing device 104. For example, the casting device 140 may be logged into a same user account as the mobile computing device 104. This user account, which is associated with the user 124, could be hosted by the server computing device 108 or another suitable server. Other suitable types of authentication could also be utilized for associating the casting device 140 with the user 124 and her/his mobile computing device 104 (unique code/key inputs, short-range wireless pairing, etc.). Once the casting device 140 is associated with the user 124 and the mobile computing device 104, the casting device 140 may be able to output audio/video information for a video chat session at the display 144. This authentication could be performed either upon establishing the video chat session (e.g., "adding" the casting device 140 to the video chat session) or in anticipation of the establishing of the video chat session. In other implementations, an input by the user 124 at the mobile computing device 104 can cause the casting device 140 to be able to receive audio/video information for the video chat session. This is also referred to herein as an "output mode" for the display 144. In this output mode, the display 144 receives (via the casting device 140) and outputs this audio/video information from the other computing device 116, but does not receive/transmit any audio/video information captured locally. Instead, this can be done using the mobile computing device 104. Thus, this may also be referred to as an "output-only" mode, although it will be appreciated that the casting device 140 and/or the television 144 could still receive other inputs (e.g., to further configure the video chat session).

The video chat session can be initiated based on a video chat request or a "video call." For example, the other computing device 116 could provide a video chat request for a video chat session with the user 124 at their mobile computing device 104. This video chat request could be received by the mobile computing device 104 directly via the network 112 or could be received by the server computing device 108, which could then coordinate the video chat session between the various devices. Thus, the mobile computing device 104 may receive only a notification or other information from the server computing device 108 and not the video chat request itself. In response to the video chat request and the detection or authentication of the casting device 140, the video chat session can be established. A notification could also be output by the display 144 (e.g., "Incoming Video Call"). The video chat session can be described as between the mobile computing device 104 and the other computing device 116. The casting device 140 may also be described as being a participant in the video chat session, although the casting device 140 likely does not receive any input of audio/video information. The display 144, however, could be associated with a camera and/or a microphone for providing such input. For example only, the display 144 could be a cast television or "cast TV" that is enabled for casting and thus could capture audio/video information, and the mobile computing device 104 could be utilized for other operations (casting configuration, video chat session initiation/transferring, etc.).

The mobile computing device 104 can transmit configuration information for the casting device 140. For example, this configuration information could be transmitted to the casting device 140 in response to the mobile computing device 104 receiving the input from the user 124 to operate the casting device 140 (and the display 144) in the output-only mode. This configuration information could be sent directly to the casting device 140 (e.g., via short-range wireless communication) or via the server computing device 108. Receipt of the configuration information by the casting device 140 or the server computing device 108 causes the routing of audio/video information from the other computing device 116 to the casting device 140. This information could also still be provided to the mobile computing device 104. Receipt of this information at the casting device 140 causes the display 144 to output the audio/video information corresponding to the other end of the video chat session (e.g., the other user 136). As mentioned above, this configuration information could be alternatively sent by the mobile computing device 104 in anticipation of (i.e., before) the establishing of the video chat session. Thus, the display 144 would experience no delay or would not miss out on outputting some of the audio/video information from the other computing device 116.

The transmission of the configuration information that causes the output of the video chat session at the display 144 can be performed automatically or in response to an explicit user input. One example of such a user input is the user 124 providing a slide or swipe input across the display 128 (e.g., for a touch display configuration) in a direction towards the display 144. This slide or swipe input could be provided, for example, at a start or during the video chat session. The mobile computing device 104, for example, may know the direction of the display 144 in the room based on short-range wireless communication with the casting device 140. Another example of such a user input is the user 124 providing a voice command to the mobile computing device 104. For example, the user 124 could say "cast," which could cause the video chat session to be "transferred" from the mobile computing device 104 to the display 144. A command could also be provided to the display 144 (e.g., via a remote), and the appropriate action could then be coordinated by the casting device 140. Similar commands could also be utilized to terminate the output by the display 144. Such commands can still be received even though the casting device 140 and the display 144 are operating in the output-only mode (i.e., there is just no audio/video information received). Another exception could be a voice command to the display 144, which could be received.

Figure 3A:
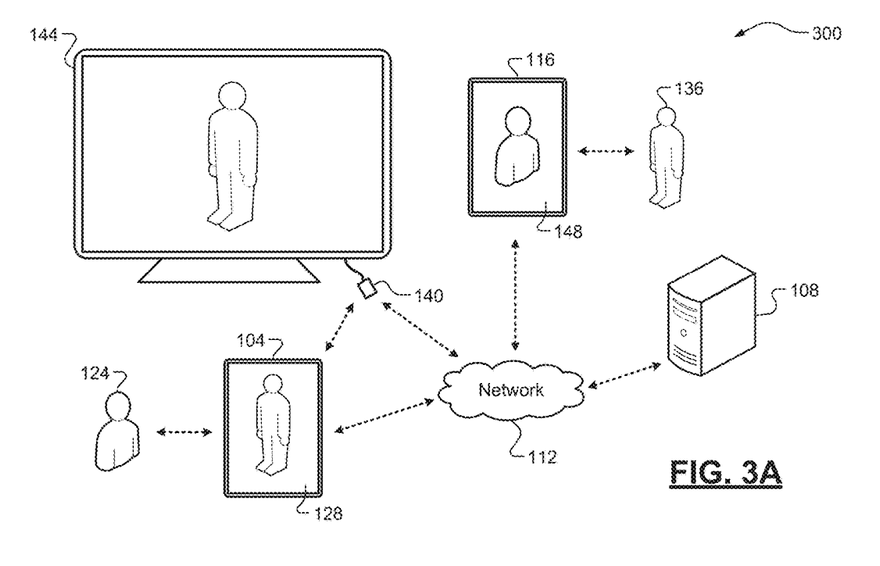
FIGS. 3A-3B illustrate example inputs/outputs during a video chat session according to some implementations of the present disclosure.
Figure 3B:
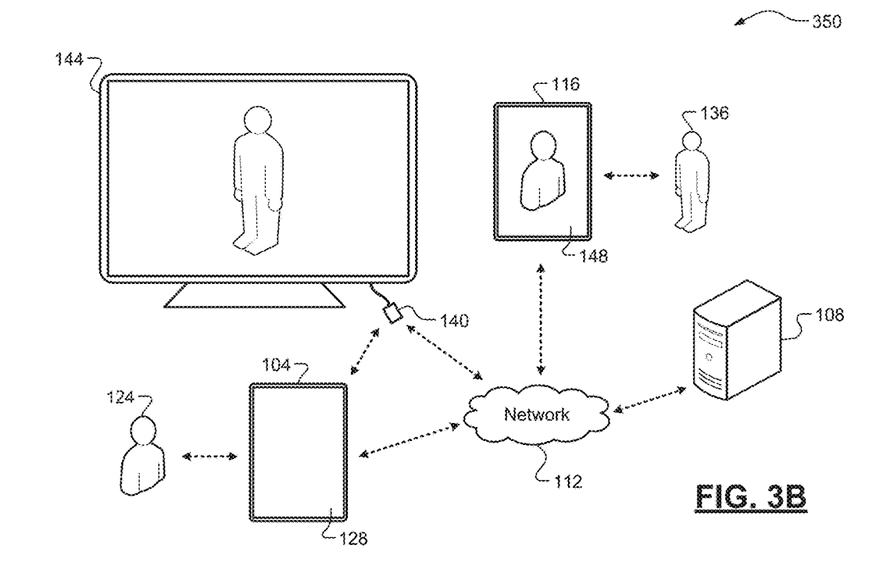

Referring now to FIGS. 3A-3B and with continued reference to FIG. 1, while a "transfer" of the video chat session is often discussed herein, the mobile computing device 104 may continue displaying the video chat session. While the display 144 is outputting the audio/video information from the other computing device 116, the mobile computing device 104 can also be capturing audio/video information (e.g., of the user 124 and another large group of users) to send to the other computing device 116. This audio/video information can be transmitted from the mobile computing device 104 to the other computing device 116 either directly or via the server computing device 108. Receipt of this captured audio/video information by the computing device 116 can cause it to output the captured audio/video information, e.g., at its display 148. FIG. 3A illustrates a first example configuration 300 of the video chat session where both the display 144 and the display 128 of the mobile computing device 104 are outputting audio/video information captured at the other computing device 116 and received via the network 112 and the server 108. FIG. 3B, on the other hand, illustrates a different second example configuration 350 of the video chat session where only the display 144 (and not the mobile computing device 104) are outputting the audio/video information from the other computing device 116. Other configurations could also be implemented, such as video-only output or audio-only output for the display 144, the mobile computing device 104, or some combination thereof.

Figure 4:
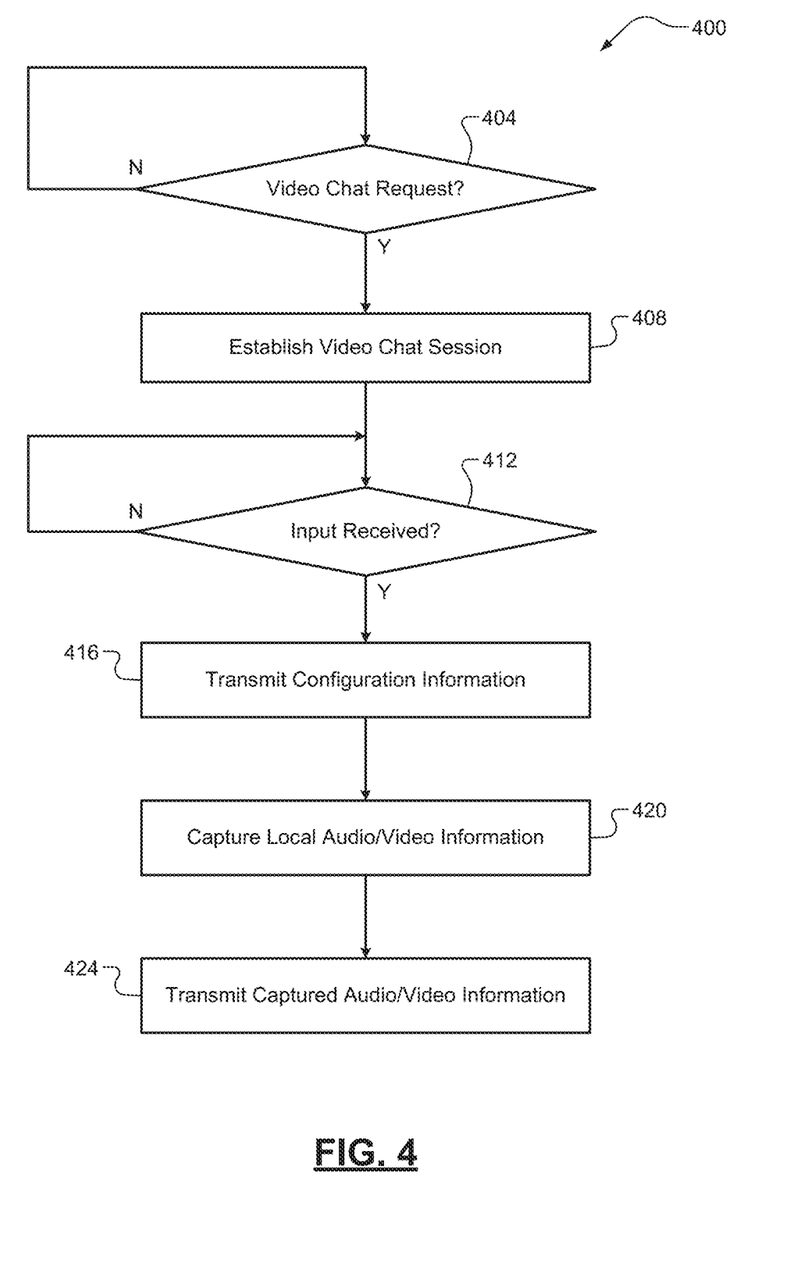
FIG. 4 is a flow diagram of an example technique for utilizing a television for a video chat session according to some implementations of the present disclosure.

Referring now to FIG. 4, an example technique 400 for utilizing the display 144 for a video chat session requested is illustrated. At 404, the mobile computing device 104 can detect a video chat request. The video chat request could be received at the mobile computing device 104, or the mobile computing device 104 could be notified of the receipt of the video chat request by the server computing device 108. When the video chat request is detected, the technique 400 can proceed to 408. Otherwise, the technique 400 can end or return to 404. At 408, the video chat session can be established between the mobile computing device 104 and the other computing device 116. At 412, the mobile computing device 104 can determine whether an input has been received by the casting device 140 (e.g., from the user 124) to operate the display 144 in an output mode. As previously discussed, in this mode, the display 144 receives (via the casting device 140) and outputs the audio/video information from the other computing device 116, but does not receive/transmit any audio/video information captured locally. Instead, this can be done using the mobile computing device 104. Thus, this may also be referred to as an output-only mode, although it will be appreciated that the casting device 140 and/or the television 144 could still receive other inputs (e.g., to further configure the video chat session). When the input has been received, the technique 400 can proceed to 416. Otherwise, the technique 400 can end or return to 412.

At 416, the mobile computing device 104 can transmit configuration information for enabling the casting device 140 to output, at the display 144, audio/video information received from the other computing device 116. In some implementations, the video chat session could be initially established with the casting device 140 (i.e., the configuration information could be sent prior to the establishing of the video chat session). This configuration information could be sent from the mobile computing device 104 either directly to the casting device 140 (e.g., via short-range wireless communication) or via the server computing device 108 and the network 112. At 420, the mobile computing device 104 can capture audio/video information and then at 424 the mobile computing device 104 can transmit the captured audio/video information to the other computing device 116. The technique 400 can then end or return to 404.

In some implementations, receipt of the configuration information causes the casting device 140 to (i) receive the first audio/video information directly from the other computing device 116 and (ii) output the first audio/video information directly via the display 144. In some implementations, receipt of the configuration information causes the casting device 140 to (i) continue outputting, via the display 144, third audio/video information corresponding to another audio/video stream and (ii) output, via the display, an indication of the first audio/video information in a smaller window than the third audio/video information. For example only, this third audio/video information could correspond to a previously initiated video streaming session, and the smaller window in which the indication is displayed could be in a corner of the display (e.g., "Incoming Video Call").

In some implementations, the mobile computing device 104 can receive another input from the user 124. This other input or corresponding instructions can then be transmitted to the casting device 140 and, upon receipt, can cause the casting device 140 to switch between the casting device 140 outputting, via the display 144, (i) the first audio/video information and (ii) third audio/video information corresponding to another video stream (e.g., a previously initiated video streaming session). Examples of this switching, but are not limited to, switching between only displaying either the first or third audio/video information, displaying both the first audio/video information in different sized windows and switching between the which is displayed in each, displaying both first and third audio/video information in equally sized windows, and the like.

In some implementations, the first audio/video information includes at least first video information, and wherein outputting, via the display, the first audio/video information includes sizing a window for the first audio/video information based on a set of size-indicative parameters. In other implementations, the first audio/video information includes only first audio information, and outputting, via the display 144, the first audio/video information includes only outputting an indicator of the first audio information (e.g., Incoming Audio Call"). In some implementations, the mobile computing device 104 can receive another input from the user 124 for adjusting a visual parameter of the video chat session. This other input or corresponding instructions can then be transmitted to the casting device 140 and, upon receipt, causes the casting device 140 to adjust, via the display 144, a visual parameter of the first audio/video information. Non-limiting examples of the visual parameter include exiting the video chat session (e.g., disabling the video), temporarily enabling/disabling the video feed (the first video information), adding visual elements (text, decorative elements, etc.), and the like.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   detecting, by a first computing device having one or more processors, a request to establish a video chat session between the first computing device and a second computing device via a server;
   in response to the detecting, establishing, between the first and second computing devices via the server, the video chat session;
   receiving, by the first computing device and from a user, an input to operate a casting device in an output mode for the video chat session, the casting device being connected to a display, wherein the first computing device and the casting device are both logged into a same account at the server;
   in response to receiving the input, transmitting, from the first computing device and to the casting device, configuration information that causes the casting device to (i) receive, from the second computing device via the server, first audio/video information for the video chat session and (ii) output, via the display, the first audio/video information during the output mode;
   capturing, by the first computing device, second audio/video information for the video chat session;
   transmitting, from the first computing device and to the second computing device via the server, the second audio/video information;
   receiving, at the first computing device and from the user, another input; and
   transmitting, from the first computing device and to the casting device, the other input, wherein receipt of the other input causes the casting device to switch between the casting device outputting, via the display, (i) the first audio/video information and (ii) third audio/video information corresponding to another previously initiated audio/video stream that is distinct from the video chat session.

2. The computer-implemented method of claim 1, wherein receipt of the configuration information causes the casting device to (i) receive the first audio/video information directly from the second computing device via the server and not from the first computing device and (ii) output the first audio/video information directly via the display.

3. The computer-implemented method of claim 1, wherein receipt of the configuration information causes the casting device to (i) continue outputting, via the display, the third audio/video information and (ii) output, via the display, an indication of the first audio/video information in a smaller window than the third audio/video information.

4. The computer-implemented method of claim 1, wherein the first audio/video information includes at least first video information, and wherein outputting, via the display, the first audio/video information includes sizing a window for the first audio/video information based on a set of size-indicative parameters.

5. The computer-implemented method of claim 1, wherein the first audio/video information includes only first audio information, and wherein outputting, via the display, the first audio/video information includes only outputting an indicator of the first audio information.

6. The computer-implemented method of claim 1, wherein the first computing device does not output the first or second audio/video information via its audio/video output devices.

7. The computer-implemented method of claim 1, further comprising:
   receiving, at the first computing device and from the user, another input for adjusting a visual parameter of the video chat session; and
   transmitting, from the first computing device and to the casting device, the other input, wherein the other input causes the casting device to adjust, via the display, a visual parameter of the first audio/video information.

8. A first computing device having one or more processors and a non-transitory memory storing a set of instructions that, when executed by the one or more processors, causes the first computing device to perform operations comprising:
   detecting a request to establish a video chat session between the first computing device and a second computing device via a server;
   in response to the detecting, establishing, between the first and second computing devices, the video chat session via the server;

receiving, from a user, an input to operate a casting device in an output mode for the video chat session, the casting device being connected to a display, wherein the first computing device and the casting device are both logged into a same account at the server;

in response to receiving the input, transmitting, to the casting device, configuration information that causes the casting device to (i) receive, from the second computing device via the server, first audio/video information for the video chat session and (ii) output, via the display, the first audio/video information during the output mode;

capturing second audio/video information for the video chat session;

transmitting, to the second computing device via the server, the second audio/video information;

receiving, from the user, another input; and transmitting, to the casting device, the other input, wherein receipt of the other input causes the casting device to switch between the casting device outputting, via the display, (i) the first audio/video information and (ii) third audio/video information corresponding to another previously initiated audio/video stream that is distinct from the video chat session.

9. The first computing device of claim 8, wherein receipt of the configuration information causes the casting device to (i) receive the first audio/video information directly from the second computing device via the server and not from the first computing device and (ii) output the first audio/video information directly via the display.

10. The first computing device of claim 8, wherein receipt of the configuration information causes the casting device to (i) continue outputting, via the display, the third audio/video information and (ii) output, via the display, an indication of the first audio/video information in a smaller window than the third audio/video information.

11. The first computing device of claim 8, wherein the first audio/video information includes at least first video information, and wherein outputting, via the display, the first audio/video information includes sizing a window for the first audio/video information based on a set of size-indicative parameters.

12. The first computing device of claim 8, wherein the first audio/video information includes only first audio information, and wherein outputting, via the display, the first audio/video information includes only outputting an indicator of the first audio information.

13. The first computing device of claim 8, wherein the first computing device does not output the first or second audio/video information via its audio/video output devices.

14. The first computing device of claim 8, wherein the operations further comprise:

receiving, from the user, another input for adjusting a visual parameter of the video chat session; and transmitting, to the casting device, the other input, wherein the other input causes the casting device to adjust, via the display, a visual parameter of the first audio/video information.

15. A non-transitory computer-readable medium having a set of instructions stored thereon that, when executed by the one or more processors of a first computing device, causes the first computing device to perform operations comprising:

detecting a request to establish a video chat session between the first computing device and a second computing device via a server;

in response to the detecting, establishing, between the first and second computing devices, the video chat session via the server;

receiving, from a user, an input to operate a casting device in an output mode for the video chat session, the casting device being connected to a display, wherein the first computing device and the casting device are both logged into a same account at the server;

in response to receiving the input, transmitting, to the casting device, configuration information that causes the casting device to (i) receive, from the second computing device via the server, first audio/video information for the video chat session and (ii) output, via the display, the first audio/video information during the output mode;

capturing second audio/video information for the video chat session; and transmitting, to the second computing device via the server, the second audio/video information, wherein receipt of the configuration information causes the casting device to (i) continue outputting, via the display, third audio/video information corresponding to another previously initiated audio/video stream that is distinct from the video chat session and (ii) output, via the display, an indication of the first audio/video information in a smaller window than the third audio/video information.

16. The computer-readable medium of claim 15, wherein receipt of the configuration information causes the casting device to (i) receive the first audio/video information directly from the second computing device via the server and not from the first computing device and (ii) output the first audio/video information directly via the display.

17. The computer-readable medium of claim 15, wherein the operations further comprise:

receiving, from the user, another input; and transmitting, to the casting device, the other input, wherein receipt of the other input causes the casting device to switch between the casting device outputting, via the display, (i) the first audio/video information and (ii) the third audio/video information.

18. The computer-readable medium of claim 8, wherein the first audio/video information includes at least first video information, and wherein outputting, via the display, the first audio/video information includes sizing a window for the first audio/video information based on a set of size-indicative parameters.

19. The computer-readable medium of claim 8, wherein the first audio/video information includes only first audio information, and wherein outputting, via the display, the first audio/video information includes only outputting an indicator of the first audio information.

20. The computer-readable medium of claim 8, wherein the first computing device does not output the first or second audio/video information via its audio/video output devices.

21. The computer-readable medium of claim 8, wherein the operations further comprise:

receiving, from the user, another input for adjusting a visual parameter of the video chat session; and transmitting, to the casting device, the other input, wherein the other input causes the casting device to adjust, via the display, a visual parameter of the first audio/video information.

* * * * *